Figure 1:
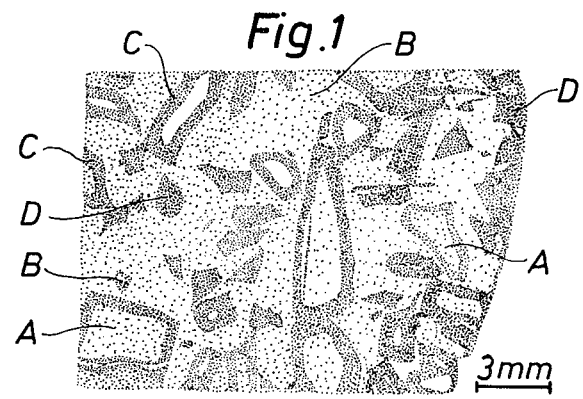

United States Patent [19]
Ekemar et al.

[11] 4,119,459
[45] Oct. 10, 1978

[54] COMPOSITE BODY CONSISTING OF CEMENTED CARBIDE AND CAST ALLOY

[75] Inventors: Sven Karl Gustav Ekemar, Saltsjö-Boo; Udo Karl Reinhold Fischer, Vallingby, both of Sweden

[73] Assignee: Sandvik Aktiebolag, Sandviken, Sweden

[21] Appl. No.: 764,553

[22] Filed: Feb. 1, 1977

[30] Foreign Application Priority Data

Feb. 5, 1976 [SE] Sweden .............................. 7601289

[51] Int. Cl.² .......................... B22F 3/00; C22C 29/00
[52] U.S. Cl. ........................................ 75/243; 428/564
[58] Field of Search ........................... 428/564; 75/243

[56] References Cited

U.S. PATENT DOCUMENTS

| | | | |
|---|---|---|---|
| 2,398,132 | 4/1946 | Cottrell | 428/564 |
| 2,833,638 | 5/1958 | Owen | 428/564 |
| 2,888,247 | 5/1959 | Haglund | 428/564 |
| 3,131,779 | 5/1964 | Rowley et al. | 428/564 |
| 3,790,353 | 2/1974 | Jackson et al. | 428/564 |

*Primary Examiner*—Brooks H. Hunt
*Attorney, Agent, or Firm*—Burns, Doane, Swecker & Mathis

[57] ABSTRACT

A metallic body in which great wear resistance is coupled with excellent mechanical strength and toughness is composed of sintered cemented carbide particles in a matrix of graphitic cast iron-base alloy, the content of carbon plus other constituents known to be equivalent to carbon in their influence on the cast iron amounts to 2.5 – 6.0%, preferably 3.5 – 5.0%.

5 Claims, 3 Drawing Figures

COMPOSITE BODY CONSISTING OF CEMENTED CARBIDE AND CAST ALLOY

The present invention relates to bonding of cemented carbide or hard metal within cast iron-base alloys, preferably cast iron, and to products of different kinds manufactured in this way. Among such products can be mentioned: wear parts such for example as wear elements used in machine parts, instruments, tools etc. and particularly in components exposed to great wear. Among other examples can be mentioned constructional elements of different kinds used under wearing conditions and cutting bodies suitable for working or cutting of material, as for example cutting tips or inserts in rock drilling or chip-forming machining. All the mentioned products are characterized in that the parts being exposed to wear or other kind of destruction consist of cemented carbide or of pure hard principles bonded in cast iron and have the shape of lumps, crushed pieces, powder, pressed bodies or parts of other arbitrary form.

For a long time there have occurred in the patent literature different proposals and ideas regarding products based upon hard metal bonded in some kind of cast alloy such as steel, cast iron or other metallic material. Also, several methods of making such products have been proposed and have been, or are still, protected by patents.

Inspite of this fact, cemented carbide is still mainly used in the form of a solid body, which body either fully constitutes the construction, the tool, etc., or is a wear-resistant detail attached to a holder or the like by means of mechanical clamping, soldering, cementing, etc. Only in exceptional cases has it been suggested to fasten or bond the cemented carbide by means of casting the holding material, and this method has normally given negative results. As an example of such earlier known fastening or bonding can be mentioned hard facing by applying fine-grained or finely crushed cemented carbide as thin layers on steel products. By heating the product or work piece during the hard facing, and possibly adding particular cast alloys, fluxing materials etc., bonding of the cemented carbide into the surfaces of the work piece has been attempted. However, so far as is known no products with a completely satisfactory quality and usability have been obtained in this way.

According to the present invention there is now available a composite body consisting of cemented carbide and cast alloy, said body having superior properties in comparison with earlier known products. By using certain specified cast alloys in combination with hard metal — said cast alloys being per se earlier regarded as completely unsuitable because of very small wear resistance — it has been possible to obtain essentially better properties of the composite product than could be produced by using much more wear-resistant cast alloys. It has also been important, however, to balance the structure, the composition and the piece size of the cemented carbide in an optimum way. Furthermore, the preparation of the composite product has been done under carefully determined process conditions including the control of the casting temperature, solidifying rate and feed of material.

In wear-resistant castings — as, for example, milling plates or wear parts for sand blast machines, ball mills and the like — there have been generally used wear-resistant alloyed cast steel or alloyed white cast iron, i.e. cast iron in which all precipitation of graphite has been restrained in some way. Any use of gray or graphite cast iron having an essentially lower wear resistance and containing normally only insignificant contents of alloying elements, has naturally been regarded completely unsuitable in this connection.

It has now been found, however, according to the present invention that steel castings as well as white cast iron — even high-alloyed very wear-resistant qualities — have given inappropriate or completely useless products in combination with cemented carbide, i.e. based upon bonding the carbide within castings, whereas bonding the cemented carbide within graphitic cast iron, on the other hand, has led to products with very good wear resistance in combination with an extraordinarily high mechanical strength and toughness.

The composition of the essentially graphitic cast iron has to be adjusted so that the carbon equivalent, C eqv. — i.e. the content of carbon besides the contents of other constituent and alloying elements equivalent to carbon having influence on the properties of the cast iron — is at the lowest 2.5 wt. % and at the most 6.0 wt. %, preferably at the lowest 3.5 wt. % and at the most 5.0 wt. %. Because silicon and phosphorus are the elements which, next to carbon, have the greatest influence on the properties of the cast iron, the carbon equivalent is usually defined according to the formula C eqv. = %C + 0.3 (% Si + % P). As also many other elements affect the properties in similar ways, there are also other, more or less complicated formulas considering this fact. It has often been found suitable to use a carbon equivalent of the cast iron being at the lowest 4.0 wt. %.

Besides normal gray cast iron, there can be used graphitic cast iron treated in different ways. In certain cases it has thus been found advantageous to use inoculated or heat-treated cast iron. For some products, particularly nodular iron, i.e. cast iron with nodular or ball-shaped graphite has been preferred.

In the composite body composed of cast iron and sintered cemented carbide according to the invention, the cemented carbide is present as pieces, crushed material, powder, pressed bodies or some other shape. The cemented carbide, which contains at least one carbide besides binder metal, is normally of WC-Co-type with possible additions of carbides of Ti, Ta, Nb or other metals, but also hard metal containing other carbides and binder metals may be suitable. In exceptional cases also pure carbides or other hard principles, i.e. without any binder phase, can be used.

It is known per se, that a cast iron forming mixed crystals or alloys with the cemented carbide should be used in the method of bonding hard metal within cast metal. According to the present invention it has been found, however, that such appearing mixed crystals or alloys are hardly of a generally favorable nature. A favorable result has been obtained only in those cases where mixed crystals or alloying phases have been formed between the cemented carbide and the earlier-mentioned type of cast iron. By use of wear-resistant steel castings, wear-resistant cast iron or other metals earlier regarded as optimum cast materials used in bonding of cemented carbide, the formed alloying phases have thus often dominated the material, because the alloy formation or the general diffusion of the elements has been too vigorous to be controlled, which circumstance in its turn has caused a strong dissolution of the cemented carbide. Furthermore, the mentioned alloying phases, having unfavorable properties as regards brittleness, irregularity and porosity, have often completely eliminated the possibility of using the composite material with any practical advantage.

In such composite products, — which preferably contain crushed hard metal, as in different kinds of wear parts, — it has been found important that the formed alloying phase or intermediate zone between hard metal and cast iron is controlled regarding its extent, amount and composition. In order to obtain successive changes of the properties and a satisfactory metallurgical bond between hard metal and cast iron it has been found that as great proportion as between 20–80% and preferably 30–70% of the original amount of the hard metal should be part of the intermediate or transition zone. Optimum results have usually been at amounts around 40–60%. This means that some of the hard metal grains or particles are completely dissolved or changed into alloying phase which, as earlier was mentioned, has a favorable influence, but naturally must not occur to such a great extent that most hard metal grains are completely transformed and lose the original wear resistance and hardness.

It has been found that a suitable adjustment of the particle size of the crushed carbide gives possibilities to reach the desired relation between completely transformed and partly transformed hard metal particles in the final product. It has been shown that at least 90% of the amount of the used hard metal should have a particle size within the interval 1–8 mm. The particle size of at least 60% of the used amount of cemented carbide should be within the range 2–6 mm. The mean particle size of the measurable amount of the crushed hard metal is preferably 2.5–4 mm.

In the composite product consisting of hard metal and cast iron it is possible to locate and observe the earlier mentioned alloy formation, causing completely or partly transformed hard metal grains or pieces, by suitable examinations of the structure, the analysis etc. (see below). In this way it is possible to put the earlier mentioned statements regarding particle sizes etc. of the added hard metal in direct relation to the corresponding conditions in the bonded state. A comparison between the original hard metal grains or pieces and the bonded grains consistiang of hard metal plus transition zone shows that the last-mentioned grains have a somewhat greater volume because the alloy formation may be seen as an addition of cast iron to the hard metal core. It has been found that this "grain growth" is favorable for the practical casting operation as well as the very construction of the composite material. On one hand, there is thus needed a close packing of the hard metal grains in order to reach maximum wear-resistance and to avoid an exposition of too great areas of the less wear-resistant cast iron. On the other hand, the channels between the grains must not be too narrow, which should prevent the passage of melt or cool the melt too rapidly during the casting. By a suitably chosen grain size according to the invention, the desired passages for the melt and the desired close packing have been obtained, meaning a decreased distance between the wear-resistant grains or particles because of the mentioned growth during the casting.

In the following example there will be illustrated an embodiment of the invention. Results obtained in comparing practical tests will be discussed and the importance of the structure of the material will be illustrated.

EXAMPLE 1

In coal-fired power generation stations the coal has normally to be crushed and milled before use. The crushing and milling of the coal was done in a certain case by means of pulverizers whose operating costs were high because of the rapid wear of certain components (which can generally be characterized as wear elements) causing frequent breakdowns and replacements.

In a large test there were compared a number of different conventional materials being used for the mentioned components, together with wear elements according to the invention consisting of crushed cemented carbide bonded within graphitic cast iron with nodular graphite, i.e. a material of the nodular iron type.

The manufacture of the wear element was done by means of casting according to known practice in preheated moulds and having the crushed hard metal partly placed upon a stretched netting of metal wire. The crushed hard metal was of the WC-Co type having a piece size of 2–6 mm. The total thickness of the wear element was about 50 mm and the stipulated thickness of the wear-resistant surface layer containing hard metal was about 10 mm. During the casting the cast alloy was superheated to a temperature corresponding to the liquidustemperature plus 150°–400° C. which temperature in the discussed material caused a suitably balanced reactivity between hard metal and cast iron.

The testings in the pulverizers included wear elements made of the following materials:

1. High alloyed, hardened, martensitic white cast iron with the nominal analysis 3% C, 15% Cr, 3% Mo, balance Fe.
2. Austenitic manganese steel, so called "Hadfield steel", with the nominal analysis 1% C, 12–14% Mn, balance Fe.
3. Steel (Swedish standard No. 1312) with the nominal analysis 0.12% C, 0.25% Si, 0.5% Mn, balance Fe having an applied hard weld of stellite material.
4. Crushed hard metal of type WC-Co bonded in graphitic cast iron with nodular graphite, i.e. nodular iron with a carbon equivalent of about 4.5% and with the cast iron analysis (in percentages): 4.0 C, 1.2 Si, 0.6 Mn, 0.024 P, 0.006 S, 0.04 Cr, 0.07 Ni, 0.01 Mo, 0.05 Al, 0.024 Mg, 0.02 Cu, 0.004 N, balance Fe.

In earlier comparison tests in laboratory scale, the material No. 4 had been found to be superior to corresponding materials based upon crushed hard metal bonded within the mentioned base materials 1–3 as well as crushed hard metal bonded within several other materials. At the full scale test there was now a comparison between three commercially used materials and the material according to the invention.

The wear of the mill components was inspected after about 200, 300, 400, 500, 900, 1300 and 2000 hours. The useful life, measured as the worn out of the component was as follows for the materials tested:

| | Material | Life |
|---|---|---|
| 1) | Hardened martensitic cast iron | 400 h |
| 2) | Manganese steel | 250 h |
| 3) | Steel with hard weld | 300 h |
| 4) | Composite product according to the invention | 2000 h |

Thus, the comparison test proved the superior properties of the composite product consisting of crushed hard metal and graphitic cast iron.

Figure 2:
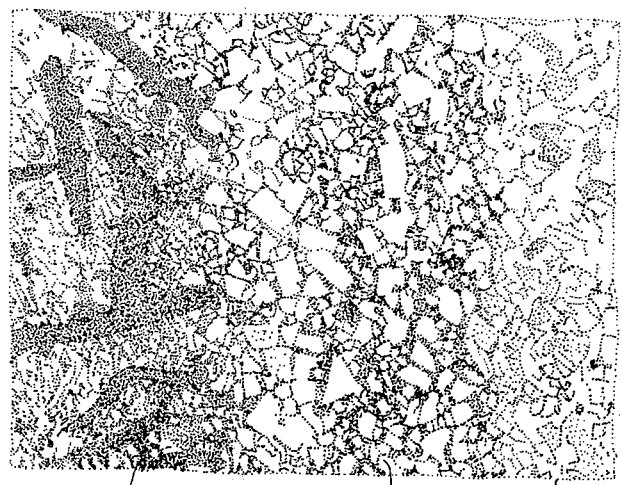
Figure 3:
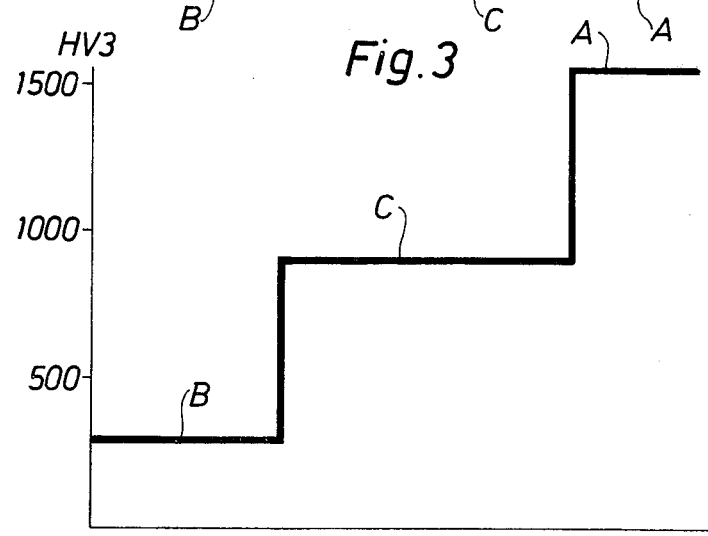

In FIGS. 1–2 there is illustrated the structure of the composite material according to the invention, as well in macro scale (magnification 3.5 times) according to FIG. 1, as in microscale (magnification 1200 times) according to FIG. 2. FIG. 3 shows the measured microhardness (HV3 kp/mm$^2$) of the material illustrated in FIG. 2.

In FIG. 1 there can be observed hard metal grains or particles A bonded within a matrix of cast iron B. Between A and B there is an alloying or diffusion zone C of relatively large size and extension. From FIG. 1 it is also evident that a relatively great number of hard metal grains or particles D are completely transformed to a mixed structure, meaning among other things a strengthening of the matrix.

FIGS. 2 and 3 show in greater detail the structure of the material next around a bonded hard metal grain or particle and the resulting hardness in this area.

It can be observed that the micro hardness of the transition zone is essentially an approximate mean value of the hardness of hard metal and the hardness of cast iron, respectively. This means, among other things, a favorable transition or successive change of the properties between the hard and wear-resistant cemented carbide and the softer but much more tenacious cast iron. As indicated before, the manufacturing of actual objects ready for use can be done in such a way that they only consist of cemented carbide bonded within cast iron.

Depending upon the kind of use, it has been found that the least mean intersection size through the space of the object consisting of hard metal bonded within cast iron should be 2–100 mm. Suitably, said interval should be 3–75 mm and preferably 5–50 mm. The proportion of cemented carbide or of hard principles in the part being exposed to wear should be 30–70 percent by volume. It should suitably be 35–65 percent by volume and preferably 40–60 percent by volume.

In some further examples there will be given details from results of testing products consisting of cemented carbide in the form of pressed and sintered bodies bonded within cast iron.

EXAMPLE 2

Percussive rock drilling has been done with 3 inch rock drill bits provided with cemented carbide button type inserts and performed as drifting in leptite rock containing iron ore. The test was done with identical bits, but in half of the bits the holding body for the inserts was made in earlier known ways of a high grade fatigue resistant steel and in half of the bits the holding body was made of cast iron according to the invention. 30 bits of each kind were tested. The result is given in the table following, and shows that a considerable technical improvement has been obtained by means of the invention in spite of the simpler and cheaper method of making the bits.

| Results Drilled length in meters | Conventional bits | Bits according to the invention |
| --- | --- | --- |
| 0 – 50 | 2 | 0 |
| 50 – 100 | 2 | 1 |
| 100 – 150 | 3 | 0 |
| 150 – 200 | 2 | 2 |
| 200 – 250 | 9 | 2 |
| 250 – 300 | 9 | 3 |
| 300 – 350 | 2 | 8 |
| 350 – 400 | 1 | 9 |
| 400 – 450 | — | 4 |
| 450 – 500 | — | 1 |
| Sum | 30 | 30 |
| Mean value of drilled length per bit | 215.9 | 331.8 |

EXAMPLE 3

Percussive rock drilling was done in primary limestone with 4½ inch bits for down-the-hole drills provided with cemented carbide cutting inserts, said stone giving very low drilling resistance. The only difference between the used bits was that half of the bit bodies were made of steel, while the other half of the bit bodies were made of cast iron according to the invention. The total number of bits were 20.

| Results Drilled length in meters | Conventional bits | Bits according to the invention |
| --- | --- | --- |
| 0 – 1000 | 1 | 0 |
| 1000 – 2000 | 3 | 1 |
| 2000 – 3000 | 4 | 1 |
| 3000 – 4000 | 2 | 3 |
| 4000 – 5000 | — | 4 |
| 5000 – 6000 | — | 1 |
| Sum | 10 | 10 |
| Mean value of drilled length per bit | 2364 | 3718 |

Also in this case it was proved possible to obtain an essential increase of effective life of the rock drills by a change to bonding of the cemented carbide inserts within cast iron according to the invention.

EXAMPLE 4

⅜ steel balls were manufactured in cold bearing dies of cemented carbide, half of the dies being of the conventional type mounted in steel bodies, the other half being bonded within cast iron. The number of dies were 10 of each kind. The steel ball material was a ball bearing steel with about 1% C and 1.5% Cr, soft annealed to a hardness of 190 HB. The following mean results were obtained:

| | Conventional dies | Dies according to the invention |
| --- | --- | --- |
| Number of punches | $1.83 \times 10^6$ | $2.88 \times 10^6$ |

Thus, the results showed that a considerable increase of the life was possible by using bodies according to the invention.

An explanation of the great improvements which have been obtained may be the greater damping capacity and lower Young's modules of cast iron in comparison with steel. By this the dynamic strains on the holding body will be reduced and distributed, at the same time as the load concentrated on critical parts of the joint between the hard metal and the holding bodies will also be reduced and distributed. Thus, cast iron has proved to be superior when used in bonding the cemented carbide according to the invention, regardless of its reputation as unsuitable in components exposed to shocks. An explanation of this may be that in tools or constructional elements provided with cemented carbide bodies, the very carbide bodies are exposed to the severe impact strains or the heavy wear and said bodies distribute these strains into the holding body. Because the characterizing damping properties of cast iron depend upon the volume concentration, the shape and the dimension of the graphite present, the cast iron shall contain graphite or corresponding elements.

We claim:

1. Metallic body having great wear resistance in combination with excellent mechanical strength and toughness, the body being composed of sintered cemented carbide and of cast iron-base alloy, the sintered cemented carbide being bonded within the cast alloy in the form of pieces, crushed parts, powder or pressed bodies, characterized in that the cast alloy is an essentially graphitic cast iron having per se low wear resistance and hardness, its composition being so adjusted that the carbon equivalent is from 2.5 to 6.0 weight percent.

2. Metallic body according to claim 1, wherein the carbon equivalent of the cast iron is at the lowest 4.0.

3. Metallic body according to claim 1, in which there is an intermediate alloying phase or transition zone between the cemented carbide the cast alloy, 20–80% of the cemented carbide being part of said transition zone.

4. Metallic body according to claim 1, wherein the carbon equivalent is from 3.5 to 5.0 weight percent.

5. Metallic body according to claim 1 wherein 30 to 70% of the cemented carbide is part of said transition zone.

* * * * *